March 9, 1965 J. J. TIPTON 3,172,384
PIPE LINE CLAMP
Original Filed Aug. 4, 1958 3 Sheets-Sheet 1
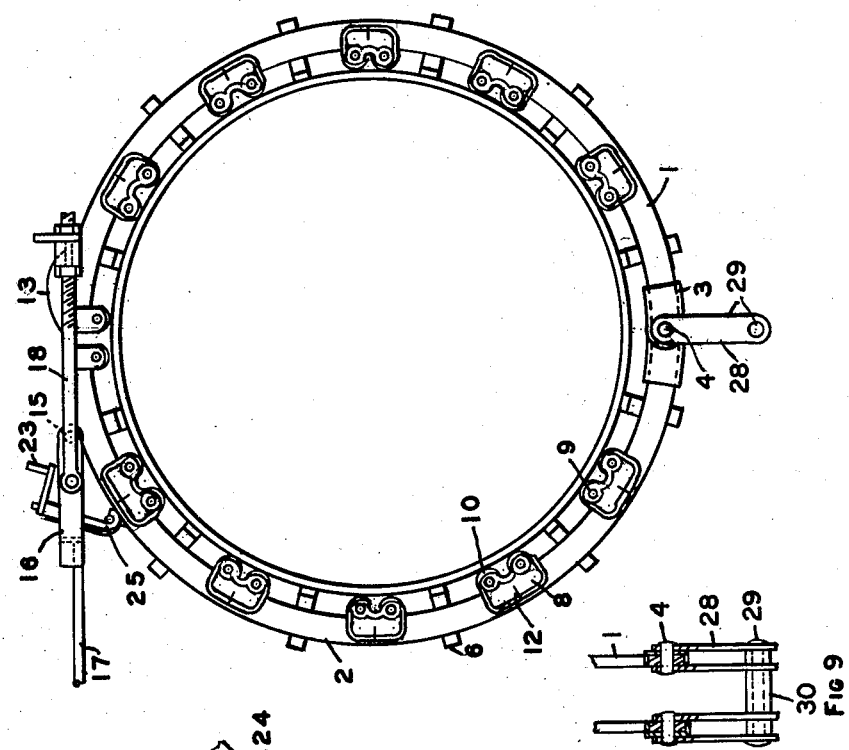
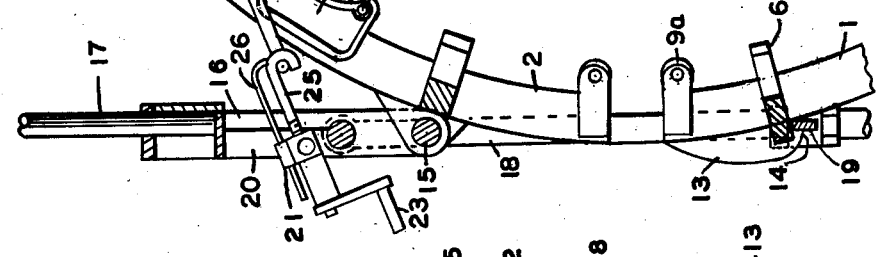
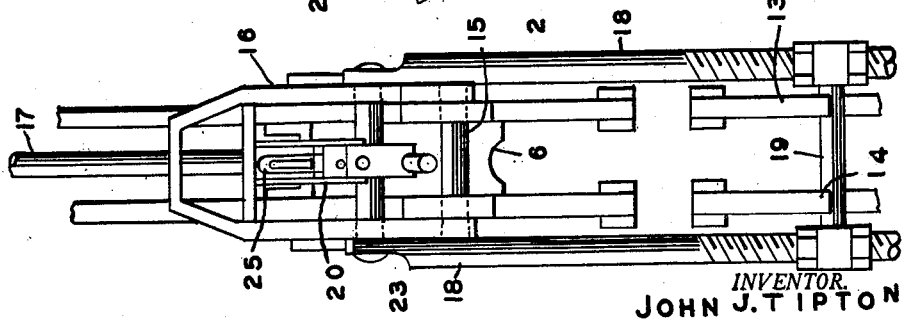
INVENTOR.
JOHN J. TIPTON
BY Kenneth M. Thorpe
ATTY.

March 9, 1965
J. J. TIPTON
3,172,384
PIPE LINE CLAMP
Original Filed Aug. 4, 1958
3 Sheets-Sheet 2
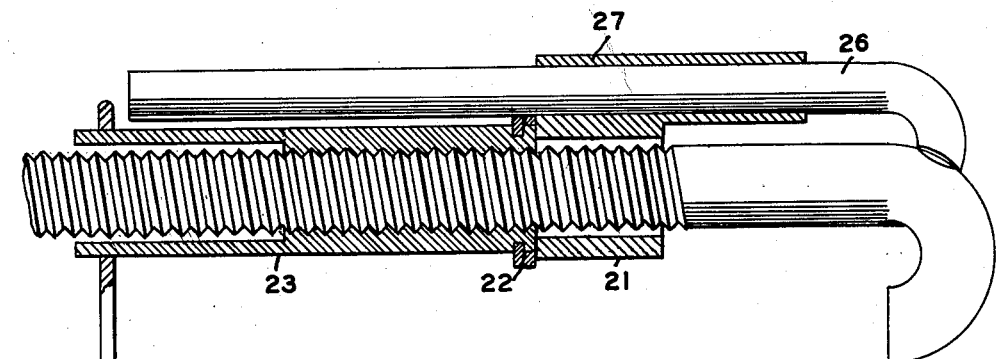
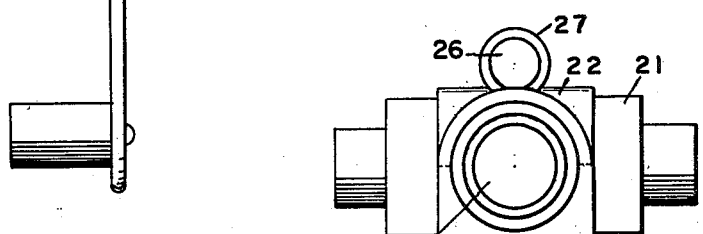
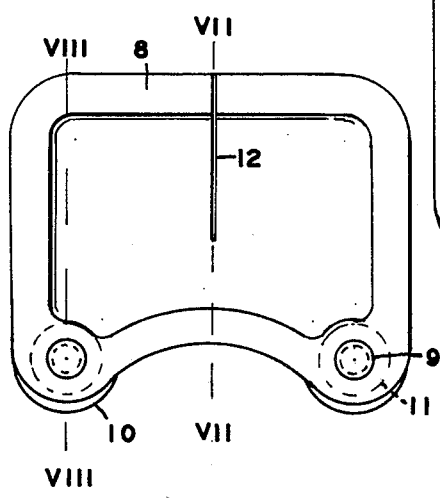
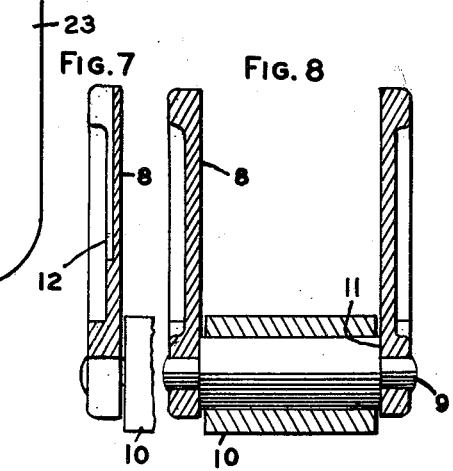
INVENTOR.
JOHN J. TIPTON
BY *Kenneth M. Thorpe*
ATTY.

March 9, 1965     J. J. TIPTON     3,172,384
PIPE LINE CLAMP

Original Filed Aug. 4, 1958     3 Sheets-Sheet 3

INVENTOR.
JOHN J. TIPTON
BY Kenneth M. Thorpe
ATTY.

United States Patent Office 3,172,384
Patented Mar. 9, 1965

3,172,384
PIPE LINE CLAMP
John J. Tipton, 9837 Overbrook Road, Leawood, Kans.
Continuation of application Ser. No. 753,394, Aug. 4, 1958. This application Jan. 14, 1963, Ser. No. 251,344
4 Claims. (Cl. 269—228)

This invention relates to pipe line clamps for the purpose of lining up pipe sections while they are being welded in the field. This application is a continuation of my presently pending application Serial No. 753,394, filed August 4, 1958, and entitled "Pipe Line Clamp," and now abandoned, which is a continuation-in-part application of my application filed September 3, 1957, Serial No. 681,635, now abandoned.

Pipe lines are used extensively throughout this country for transporting many fluids and normally comprise a plurality of elongated pipe sections connected in tandem relation to provide the desired length for the pipe line. These pipe sections are frequently welded together in the field, and it is desirable that each adjacent section of pipe be substantially circular in cross sectional configuration for facilitating the welding operation. The adjacent pipe sections are usually welded together by a continuous circumferential weld, and the disadvantages of connecting two adjacent sections of out-of-round pipe will be apparent.

Many types of pipe clamping devices have been developed for reshaping the out-of-round pipe sections and holding or clamping adjacent sections thereof during the welding operation, such as the pipe line clamp shown in my prior Patent No. 2,846,968, issued August 12, 1958, and entitled "Mechanical Pipe Line Clamp." These devices have proven very successful in actual working conditions, but some difficulty has been encountered in installing the clamps on the pipe section, particularly on pipe sections that are unduly warped or deformed from the substantially round outer configuration. These clamping devices normally utilize a plurality of circumferentially spaced single clamp members for transferring the forming pressure to the pipe during the clamping operation, and frequently these pressure transferring members will produce flat spots on the outer periphery of the pipe upon the application of sufficient pressure for reshaping of the pipe section.

The present invention contemplates a novel pipe clamping apparatus particularly designed and constructed for ease of installation around pipe sections through the utilization of roller members whereby the pipe clamp may be more readily clamped around the outer periphery of the pipe sections. In addition, dual roller assemblies are utilized whereby the formation of flat spots on the outer periphery of the pipe sections during the clamping and forming operation is substantially eliminated. The dual roller assemblies are designed so that they can be used with clamps for pipes from about 12″ in diameter and larger and are designed so that they can be welded in position without distortion of the contours of the jaws, said rollers preferably projecting inward about $\frac{1}{16}$ to $\frac{1}{8}$ inch further than the operating faces of the clamp bars so that the clamp assembly can be freely rotated around the pipe before it is clamped in position.

Furthermore, the novel clamping apparatus is provided with a latching mechanism which pulls substantially tangentially of the outer diameter of the pipe to provide a more efficient clamping operation, and the locking mechanism is arranged for latching the clamp at substantially any desired degree of closing position thereof against the spring-back tendency of the compressed pipe. The locking mechanism herein illustrated shows a pull type screw jack, but it may be hydraulic or of other construction, and may be designed not only as a holding latch but also be used to close the clamp around the pipe as it will compound the applied force on the eccentric closing linkage. A special key-hole shaped clamping bar is provided in order that the clamping pressure for retaining the adjacent pairs of clamped pipe sections may be centered as close as possible to the welding line therebetween. The novel pipe clamp is simple and efficient in operation and economical and durable in construction.

It is an important object of this invention to provide a clamp having rollers which rest on the pipe to be clamped for assisting in the closing of the clamp around the outer periphery of the pipe to bring out-of-round pipes to a substantially circular contour and in positioning the clamp at the desired point circumferentially of the pipe.

Another object of this invention is to provide a clamp mechanism wherein the pull on the clamp during the clamping operation is substantially tangential of the outer diameter of the pipe which results in a more efficient clamping operation and facilitates rounding out of the pipe ends.

It is another object of this invention to provide a locking mechanism which is subject to manual control whereby the clamp may be latched at substantially any desired degree of closed position against the spring-back tendency of the compressed pipe to avoid a hazard to operating personnel.

A further object of this invention is to provide a clamp having a clevis lift arrangement whereby the clamp may be hoisted to and from operative position in an open position with the clamping position immobilized against free oscillation for avoiding additional personnel hazard.

It is a still further object of this invention to provide a clamp apparatus having dual roller assemblies to substantially preclude the formation of flat spots in the pipe during the clamping and forming operation.

It is another object of this invention to provide a clamp mechanism of an adjustable construction for accommodating variations in outside diameter of pipe to be welded.

A still further object of this invention is to provide a clamp apparatus having special key-hole shaped clamping bars whereby the clamping pressure may be centered as close as possible to the welding line.

Other and further objects and advantageous features of the present invention will hereinafter more fully appear in connection with a detailed description of the drawings in which:

FIGURE 1 is a side elevational view of a pipe line clamp embodying the invention.

FIGURE 2 is an enlarged fragmental sectional view taken through the clamping mechanism of the invention.

FIGURE 3 is an end elevational view of the construction as shown in FIGURE 1.

FIGURE 4 is an enlarged detail sectional view through the safety lock of the invention.

FIGURE 5 is an end view of the construction shown in FIGURE 4.

FIGURE 6 is an enlarged side elevational view of the roller assembly construction of the invention.

FIGURE 7 is a sectional view taken on line VII—VII, of FIGURE 6.

FIGURE 8 is a sectional view taken on line VIII—VIII of FIGURE 6.

FIGURE 9 is a fragmental elevational view of the lifting clevis as it appears when attached to the pivotal point of the clamp jaws.

Figure 10:
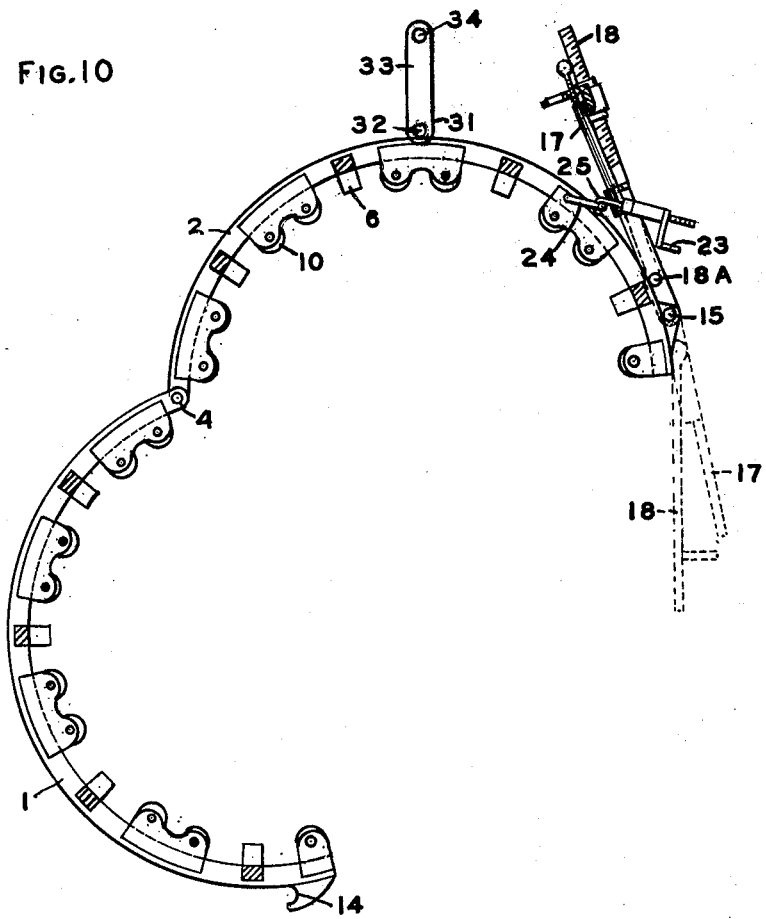
FIGURE 10 is a side elevational view of a clamp embodying the invention and with a clevis attached to one clamp jaw, the clamp being opened and the clamping mechanism being immobilized against free oscillation.

Referring to the drawings in detail, the clamp of the invention comprises two pairs of semi-circular ring bars 1 and 2, which conjointly comprise a pair of clamp jaws. The bars 1 are reinforced at one end by plates 3 which carry pivot bolts 4 on which the ends of the bars 2 are journaled.

Figure 13:
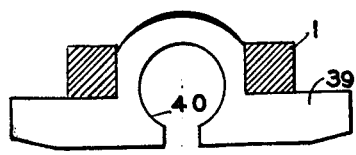
FIGURE 13 is a sectional view through a clamp jaw to illustrate the special key-hole shaped clamping arch bar.

The pairs of bars 1 and 2 are held in permanent fixed relation by a series of radially arranged arch clamping lugs 6 which have their inner ends contoured to fit pipe to be clamped. As an alternate the preferred type of arch lug is shown at 39 in FIGURE 13, where the arch is in the form of a key-hole shaped opening to bring the clamping pressure as closely as possible to the weld line. Intermediate the arches 6 or 39, roller assemblies which comprise identical side plates 8, are secured together by dual shafts 9 formed with shoulders 11 to fix plates 8 in spaced relation. The shafts are either tack welded or riveted to hold the parts together.

Journaled on the shafts 9 are rollers 10. The side plates 8 are preferably cast with a heavy marginal bead having a thinner web center portion and are transversely formed with a kerf or score 12 to provide an expansion space in the welding operation so that the bars 1 and 2 will not be warped out-of-round. In practice the structure is set up in a jig and the clamp lugs 6 are first welded to bars 1 and 2, then shims may be inserted below the clamp lugs to raise them from the plane of the simulated pipe fixture, and then the roller assemblies are welded in position while in contact with the pipe fixture. With this method of assembly proper contour and spacing of the rollers is insured regardless of any irregularities that may exist in the contour of the rings bars 1 and 2.

The free ends of one clamp jaw 1 are provided with a lug 13 in which hooks 14 are formed. Pivoted at 15 to the end of the jaw 2 are the bifurcated ends 16 of a lever arm 17. Pivot shaft 18A is carried by the ends 16 of lever arm 17, eccentric of pivot 15, and journaled on said shaft 18A are a pair of clamp links 18 which are threaded at their ends and adjustably received a cross latch or bar 19. The ends of the bar 19 terminate in enlargements 19A (see FIGURES 10 and 11), having through openings to slide on the links 18 and locked in adjusted position between nuts 19B so that the effective length of link arms 18 can be adjusted to compensate for variations in the outside diameter of pipe to be clamped, when the bar 19 engages the hooks 14 to close the jaws around a pipe. In this connection it will be noted that the latch bar 19 is backed-up or reinforced by one of the arches 6, the initial rollers 9a, arches 6, pivot 15 and latch bar 19 being so located that pressure is applied tangentially of the pipe in the clamping operation.

As the clamping pressure increases, particularly in out-of-round pipe, the resiliency of the pipe tends to exert spring-back force against the closing movement of the lever 17. In order to assist in closing the clamp, a power compounding pull or push jack of any suitable type, screw, lever or hydraulic may be used. A screw type pull jack is illustrated by the following mechanism:

Pivoted between a pair of straps 20 carried by the ends 16 of lever arm 17, is a swivelled rocking block 21 and loosely reciprocating through said block is a hook bolt 25. Swivelled to one side face of the block 21 is a crank 23, said crank being held in position as by a pair of split washers 22 welded to the block with one edge in a kerf formed in the end of the internally threaded crank 23. The threads of the hook bolt 25 engage the threads in the crank 23. This arrangement is provided so that the bolt 25 may be projected to engage a latch bar 24 carried by the jaw 2. In the rotation of the crank, the bolt 25 is held against rotation by means of a guide stem 26 welded to the end of the hook bolt and sliding through a guide tube 27 welded to the top of the block 21. With this arrangement the lever arm 17 may be locked at any point in clamping adjustment and the closing tension can be increased as the leverage of the screw hook on the latch bar compounds the applied force or power. In practice it is desirable that the angle formed by the hook in relation to the lever arm 17 shall be about 138 degrees as this angle has been found to be the best to pull the clamp around the pipe rather than pulling away from the pipe at some points.

As clamps of the general type shown are heavy it has been found that a hoist should be used in positioning or removing the clamp from a pipe. In one construction to provide a suitable hoisting clevis, the hinge pins 4 are welded to clevis straps 28 which are connected at their ends by a bolt 29 and spacing sleeves 30, as shown in FIGURE 9. With this arrangement, the clamp may be lifted onto a pipe and then partially closed and rotated on its rollers 9a and 10 until the desired point is reached. The clamping operation is then completed as above described.

Figure 11:
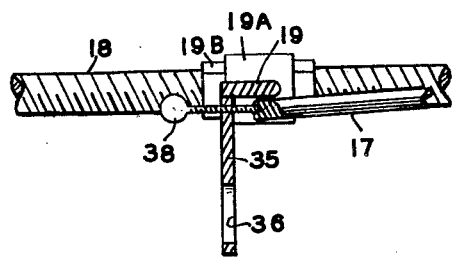
FIGURE 11 is an enlarged fragmental sectional view to show one method of immobilizing the clamp links to the lever arm when the clamp is in the position shown in FIGURE 10.

As an alternative suspension or clevis arrangement the construction shown in FIGURE 10 may be used, where the clevis arms 33 are attached to the jaw 2 as by a pipe section 31 welded to the outer edges of the jaw, said pipe sections receiving pins 32 to which the ends of arms 33 are secured. The upper ends of the arms 33 carry a suspension rod 34. By preference this clevis is secured at such point that jaw 2 is substantially balanced over a pipe when the clamp is open and is freely suspended or the jaw 1 can be manually swung back to permit the clamp to receive the pipe to be welded.

Figure 12:
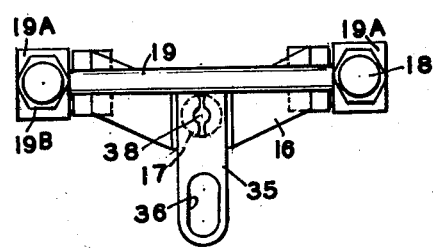
FIGURE 12 is an end view of the construction as shown in FIGURE 11.

When the clamp is suspended as in FIGURE 10 or in any position in which the clamp lever 17 and the links 18 are freely pendent, it has been found that they constitute hazards to personnel. In order to provide means to tie or immobilize these parts when the clamp jaws 1–2 are open, the lever 17 is swung to overlie clamp jaw 2 and the hook 25 is engaged with catch 24. Crank 23 is then rotated to lock lever 17 in position as by clamping shaft 18A against the outer edges of the jaw 2. The link arms 18 are now swung down until clamp bar 19 contacts the lever extension 17, and may be locked fast as by manipulation of a set screw 38 carried by a handle flange 35 welded to the clamp bar 19, and the end of said set screw seating in a socket in the end of the arm 17, see FIGURES 10, 11 and 12.

It will be apparent that the dual roller assemblies contact the outer periphery of the pipe section during the clamping operation and transmit forming pressure thereto in a manner whereby the forming of flat spots on the pipe is substantially eliminated. Thus, the dual roller assemblies not only facilitate the clamping or disposition of the clamping apparatus around the pipe, but also increase the efficiency of the forming operation.

From the foregoing, it will be apparent that the present invention provides a novel clamping apparatus particularly designed and constructed for ease of disposition around substantially any pipe section to be clamped thereby. Dual roller assemblies are provided for facilitating pulling of the clamp into the clamped position, and for reshaping out-of-round pipe sections in a manner substantially precluding the formation of flat spots on the outer periphery thereof. The latching mechanism provides for a tangential pull on the clamping members for cooperating with the roller assemblies to facilitate the clamping operation, and may be latched in substantially any desired degree of closed position against the compressed pipe to reduce personnel hazards. In addition, the clevis lift member is so arranged as to hoist the clamping apparatus to and from operative position with the clamping mechanism immobilized against free oscillation for further reduction of personnel hazards.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. In a pipe line clamp, a pair of semi-circular jaws hinged together at one end, each jaw comprising a pair of spaced members, a plurality of bars projecting radially inward from said jaws and securing the members thereof in fixed spaced relation, each bar provided with a key-hole spaced arch, an eccentric clamping lever pivoted to the free end of one jaw, a link pivoted to the lever eccentric to its pivotal point to the jaw and having detached engagement with the free end of the other jaw, means to secure the clamping lever and link pivoted thereto in a position overlying one of said jaws when the pipe clamp is in an open position, a hoisting clevis assembly secured to one of said jaws at a point to permit the jaws to be balanced when the pipe line clamp is in an open position, a plurality of tandem dual roller assemblies projecting radially inward from each member and positioned between the bars, the operating face of the rollers being located in a surface to contact a pipe whereby forming pressure may be applied to the pipe, the axis of said rollers being disposed parallel to the axis of the pipe, and each dual roller assembly including a pair of relatively closely spaced rollers to preclude the formation of flat portions on the outer periphery of the pipe when the clamp is applied to the pipe.

2. A pipe line clamp, a pair of semi-circular jaws hinged together at one end, each jaw comprising a pair of spaced clamp bars, arched clamp bars securing each pair of spaced clamp bars together, an eccentric clamping mechanism carried by the free ends of the jaws and cooperating to provide a tangential pulling force on the jaws when the clamp is applied to a pipe, a plurality of tandem dual roller assemblies projecting radially inward from each of the pairs of spaced clamp bars, said assemblies comprising a pair of plates embracing and welded to the faces of the spaced clamp bars, each pair of said plates provided with a pair of relatively closely spaced roller members journaled therebetween and having the operating face of the roller members located in a surface for engaging the outer periphery of the pipe in the clamped position whereby forming pressure may be applied to the pipe, the axis of said rollers being disposed parallel to the axis of the pipe, shouldered shafts nonrotatably carried by the plates, said shoulders securing the plates in spaced relation and supporting the said rollers between said plates.

3. In a pipe line clamp, a pair of jaws hinged together at one end, a clamp mechanism for drawing the other ends around a pipe to be welded, each jaw comprising a pair of identical semi-circular members and a series of clamped bars projecting radially inward from said jaws and securing the members thereof in a fixed spaced relation, each clamp bar having a key-hole spaced arch interposed between the said members, a plurality of tandem dual roller assemblies projecting inwardly from each member and positioned between the clamp bars, the operating face of the rollers being in a surface to contact a pipe whereby forming pressure may be applied thereto, the axis of said rollers being disposed parallel to the axis of the pipe when the clamp is applied to the pipe, said dual roller assemblies including a plurality of spaced pairs of complementary rollers wherein each of said complementary rollers are disposed in relatively close relationship to substantially preclude the formation of flat portions in the pipe being clamped.

4. In a pipe line clamp, a pair of semi-circular jaws hinged together at one end, each jaw comprising a pair of spaced members, a plurality of bars circumferentially spaced around the jaws projected radially inward and connecting the members together, and a plurality of dual roller assemblies projecting radially inward from each member and positioned between the bars, each of said dual roller assemblies comprising a pair of plates embraced and welded to the faces of the spaced members, a pair of roller members journaled between the said pair of plates and spaced relatively closely together to preclude the formation of flat portions in the outer periphery of a pipe being clamped, and the operating face of the rollers being located in a surface to contact the pipe whereby forming pressure may be applied thereto.

References Cited by the Examiner

UNITED STATES PATENTS

| | | | |
|---|---|---|---|
| 2,500,204 | 3/50 | Ronay | 113—103 |
| 2,557,202 | 6/51 | Raymond et al. | 113—102 |
| 2,846,968 | 8/58 | Tipton | 113—102 |

CHARLES W. LANHAM, *Primary Examiner.*